(12) United States Patent
Cook

(10) Patent No.: US 6,956,930 B1
(45) Date of Patent: Oct. 18, 2005

(54) APPARATUS, AND ASSOCIATED METHOD, FOR FACILITATING ROUTING OF A CALL TO A PUBLIC SAFETY ANSWERING POINT

(75) Inventor: Russell R. Cook, Garland, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/712,881

(22) Filed: Nov. 13, 2003

(51) Int. Cl.[7] ............................................ H04M 11/04
(52) U.S. Cl. ..................... 379/45; 379/220.01; 379/42; 379/37
(58) Field of Search ....................... 379/37–51, 201.01, 379/220.01, 221.01, 221.03

(56) References Cited

U.S. PATENT DOCUMENTS 6,721,395 B2 * 4/2004 Martinez ..................... 379/45
6,771,742 B2 * 8/2004 McCalmont et al. ......... 379/45

FOREIGN PATENT DOCUMENTS

EP        1111888 A2    6/2001

* cited by examiner

Primary Examiner—Wing Chan
(74) Attorney, Agent, or Firm—V. Lawrence Sewell

(57) ABSTRACT

Apparatus, and an associated method, for facilitating service handling of a call placed to a public safety answering point using a universal dialing code, such as an emergency 9-1-1 dialing code. A centralized routing database is formed and maintained. When a call is originated and routed to a call routing entity, the centralized routing data base is accessed to obtain the identity of the public safety answering point to which to route the call. Thereby, a call connection is formed to an appropriate public safety answering point. Due to the centralized nature of the routing data base, updates to the data base are readily and easily ascertainable.

17 Claims, 3 Drawing Sheets

| 56 | 46 | 58 |
|---|---|---|
| CP | | PSAP |
| TELEPHONE NUMBER 1 | | PSAP ID |
| ⋮ | | ⋮ |
| TELEPHONE NUMBER N | | PSAP ID |

| 64 | 48 | 66 |
|---|---|---|
| XY | | PSAP |
| $X_1Y_1$ | | PSAP ID |
| ⋮ | | ⋮ |
| $X_NY_N$ | | PSAP ID |

APPARATUS, AND ASSOCIATED METHOD, FOR FACILITATING ROUTING OF A CALL TO A PUBLIC SAFETY ANSWERING POINT

The present invention relates generally to a manner by which selectably to route a call placed during operation of a telephonic communication system to a service center identified by a universal calling code, such as a public safety answering point (PSAP) forming an emergency 9-1-1, or other, service center. More particularly, the present invention relates to apparatus, and an associated method, that provides a centralized data base that lists information used to facilitate routing of calls, originated at calling stations, to selected public safety answering points. The information maintained at the centralized data base is accessible by any switch entity of the telephonic communication system. When a call is originated at a calling station using a universal calling code, the call is routed to a call routing entity. The call routing entity accesses the centralized data base to determine to which public safety answering point to deliver the call.

When stored information, stored at the centralized data base, needs to be updated, the centralized nature of the centralized data base facilitates quick, and relatively straightforward, operations to update the information. The conventional need otherwise to access, and update, stored information, conventionally stored at distributed switch entities is obviated.

BACKGROUND OF THE INVENTION

Many aspects of modern society require the availability of modern communication systems through which to communicate data. A communication system is formed, at a minimum, of a sending station and a receiving station. The sending and receiving stations are interconnected by way of a communication channel. Data that is to be communicated is sourced, or otherwise originated at, the sending station. The data is sent upon the communication channel to the receiving station. the receiving station operates to receive the data communicated upon the communication channel and to recover the informational content thereof.

While many different types of communication systems have been developed and deployed, telephonic communication systems are perhaps the most pervasive and popularly utilized communication systems. Telephonic communication systems include telephonic networks through which telephonic communications are effectuated. Telephonic stations are connected, in communication connectivity, with a telephonic network. And, the telephonic stations form originating and terminating stations between which users communicate telephonically. Telephonic communication of both voice data and non-voice data is provided by various types of telephonic communication systems.

Telephonic communications are effectuable, for instance, between a calling party that originates a call at an originating telephonic station and personnel located at a service center forming a public safety answering point. The service centers are identified by shortened dialing codes forming universal dialing codes, at least throughout selected geographical areas. For instance, in the United States, the three-digit telephone number 9-1-1 forms a universal emergency number, used by a calling party to call an emergency service center forming a public safety answering point. In other geographical areas, analogous dialing numbers are used to identify analogous service centers.

That is to say, the 9-1-1, or other analogous, dialing code forms a nationwide telephone number in the United States, usable by any calling party to place a call to the emergency service center forming the public safety answering point. A large number of public safety answering points are positioned throughout the nationwide, geographical area. Each of the public safety answering points is identified by the same universal dialing code. Call routing must route the call to an appropriate service center. Typically, the appropriate service center is a service center positioned in close proximity to the location from which the call is placed.

The National Emergency Numbering Association (NENA) is involved in the planning and implementation of a universal, 9-1-1 telephone number system in the United Sates. Such universal telephone number systems are embodied in existing telephonic communication systems. The NENA also defines 9-1-1 technical issues and recommends solutions to the technical issues, maintains a public safety answering point registry containing contact information relating to the public safety answering points, and maintains links to public safety related organizations and communication centers.

The universal, 9-1-1 emergency telephone number systems generally include, or make use of, several network elements. Such network elements include, for instance, end office switches, E-911 tandem switches, and public safety answering point end nodes.

When a call is placed by a calling party at a calling station, the call is connected to an end office. The end office, in turn, routes the call to a selected one of a plurality of E-911 tandem switches that serves an area. The E-911 tandem switches operate, amongst things, to select and to hand off the call to a selected one of a plurality of public safety answering points that service the area. Thereby, a 911, or other analogous, call originating at an originating calling station, i.e., an end user telephone, is routed by way of a local end office to an appropriate E-911 tandem switch. Signaling is performed pursuant to the call routing. In some networks, multi-frequency (MF) signaling is utilized; in some other networks SS7 ISUP signaling is performed.

Conventionally, the selection of the selected public safety answering point to which to deliver the call is made by accessing an on-board selective routing data base embodied at each of the E-911 tandem switches. The data base includes a listing of the originating telephone number, i.e., the dialing number associated with the originating station and the identity of a public safety answering point associated with the originating telephone number. There is, e.g., a single public safety answering point associated with each telephone number. The identity of the public safety answering point is derived from an emergency services number (ESN) of the public safety answering point. The tandem switch uses the ascertained emergency services number to select the appropriate public safety answering point and to transfer the call there. Alternate routing provisions are sometimes also provided to permit routing of the call to a substitute public safety answering point should all circuits for the primary public safety answering point be in use or blocked.

The information used to route the call to the selected public safety answering point is distributed throughout the network of the telephonic communication system. That is to say, the information is stored at each of the E-911 tandem switches. When the information needs to be updated, such as when the ESN of a PSAP changes, potentially a large number of data bases must be correspondingly updated. Updating of the large number of data bases is potentially an arduous and costly task.

Additionally, as the emergency 9-1-1 dialing code might be entered by a mobile station, the selected public safety answering point to which the call should be routed is susceptible to change, depending upon the location at which the mobile station is positioned when the call is placed. The existing emergency system is predicated upon fixed-positioned telephonic stations. Additional steps must be undertaken to determine the selected public safety answering point to which to route the call placed by a mobile station.

If a manner could be provided by which to overcome these problems associated with conventional emergency dialing services in a telephonic communication system, improved call routing would be possible.

It is in light of this background information related to routing calls in a telephonic communication system that the significant improvements of the present invention have evolved.

SUMMARY OF THE INVENTION

The present invention, accordingly, advantageously provides apparatus, and an associated method, by which selectably to route a call placed during operation of a telephonic communication system to a service center identified by a universal calling code, such as a public safety answering point forming an emergency 9-1-1, or other, service center.

Through operation of an embodiment of the present invention, a manner is provided by which to form and to utilize a centralized data base. The centralized data base lists information used to facilitate routing of a call originated at a calling station to a selected public safety answering point. The contents of the data base are updateable, as needed, to maintain an accurate association between calling stations and public safety answering points to which emergency 9-1-1, or other appropriate, calls originated at such telephonic stations are to be routed. Due to the centralized nature of the centralized data base, when updates to the information stored thereat are needed, the updating of the information is relatively speedily and easily effectuated. The conventional need to update a large number of data bases, embodied at distributed tandem switches throughout a telephonic network is obviated.

In one aspect of the present invention, the listing formed at the centralized data base includes telephonic identities of telephonic stations of the telephonic communication system. When the telephonic communication stations form land line, i.e., fixed-location, stations, the telephonic stations, and their identities, are functions of their locations. The telephonic identies of the telephonic stations are indexed together with the identities of public safety answering points that are to be associated with the corresponding telephonic identifies. That is to say, a public safety answering point is associated with each telephonic number identified in the listing. When the telephonic number identifies a land line telephonic station, the telephonic number is a function of the location of the telephonic station. And, the public safety answering point associated with the telephonic station is generally a public safety answering point located at a position located in geographical proximity to the telephonic station.

When an originating party enters the emergency 9-1-1, or other analogous, calling code at a telephonic station, the call request is routed through the telephonic network to a call routing entity, such as an E-9-1-1 tandem switch, and, from there, the centralized routing data base is accessed to determine to which public safety answering point to route the call further. When the identity of the public safety answering point is ascertained, the call request is further routed accordingly. The centralized routing data base is embodied, for instance, at a signaling transfer point (STP) or a service control point (SCP) to which call routing entities, such as E-9-1-1 tandem switches have access.

When every call routing entity through which an emergency call request might be routed is maintained in communication connectivity with the centralized data base, only a single centralized routing data base, perhaps together with an appropriate backup, is needed for an entire telephonic communication system. Updating, when necessary, of information stored at the centralized routing data base is more readily and speedily performed than in existing call routing schemes that use distributed data bases embodied at individual E-911 tandem switches or other call routing entities.

When the telephonic station at which an originating party originates a call request to the emergency services center is a mobile station, the call is routed to a public safety answering point associated with the position of the mobile station when the mobile station originates the call. Due to the mobile nature of the mobile station, the positioning of the mobile station is susceptible to change. A centralized data base is maintained to identify the positioning coordinates of the mobile station together with public safety answering points to be associated with the mobile station when the mobile station is positioned within a particular area. In one implementation, when an inquiry is made of the centralized routing data base by a call routing entity, further inquiry is made of the positional indicia associated with the mobile station and the public safety answering point associated therewith.

Thereby, a manner is provided by which to facilitate routing of a call placed to a service center utilizing a universal dialing code. A centralized routing data base is formed and maintained that is readily updateable, thereby better to ensure that a call placed using the universal dialing code is completed to an appropriate public safety answering point.

In these and other aspects, therefore, apparatus, and an associated method, is provided for a telephonic communication system. The telephonic communication system is permitting of a call, originated at a calling station, to be placed to a selected public safety answering point of a set of public safety answering points. The call is placed by way of a call routing entity of a set of call routing entities. Service handling of the call to the selected public safety answering point is facilitated together with providing selected information pertaining to the calling station to the selected public safety answering point. A centralized routing data base is maintainable in communication connectivity with each call routing entity of the set of the set of call routing entities. The centralized routing data base contains a listing indexing together a calling station identity of the calling station and a public safety identity of at least one of the public safety access points. The centralized routing data base is accessed by the call routing entity by way of which the call is placed, at least to identify the selected public safety answering point to which to route the call. The selected public safety answering point comprises the public safety answering point indexed together with the calling station.

A more complete description of the present invention and the scope thereof can be obtained from the accompanying drawings that are briefly summarized below, the following detailed description of the presently-preferred embodiments of the invention, and the appended claims.

DETAILED DESCRIPTION

Figure 1:
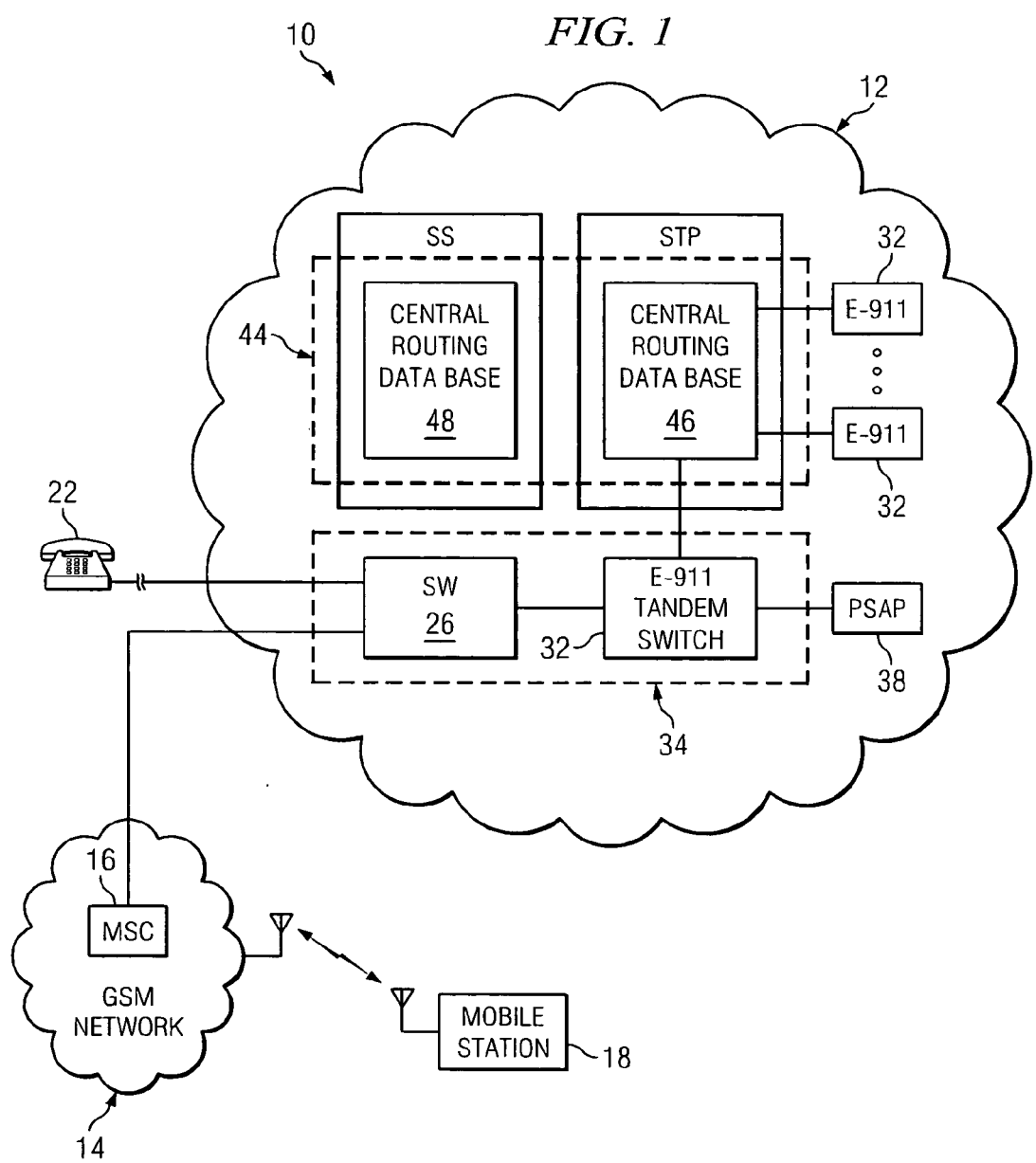
FIG. 1 illustrates a functional block diagram of a telephonic communication system in which an embodiment of the present invention is operable.

Referring first to FIG. 1, a telephonic communication system, shown generally at 10, provides for telephonic communications between telephonic stations connected in, or otherwise coupled in, communication connectivity therein. The telephonic communication system is representative of various system implementations including, for instance, a TDM (time division multiplexed) system, or a packet based system.

The system includes a telephonic network 12 that includes network entities and elements providing call routing and call connection functions to form call connections between originating and terminating telephonic stations. In the exemplary implementation, the telephonic network forms a TDM network, and the following description shall describe operation of the communication system with respect to its exemplary implementation in which the network 12 is formed of a TDM network. Operation of the telephonic communication system can analogously be described with respect to an implementation in which the telephonic network is of a different network type.

The telephonic communication system further includes a wireless network, here a GSM (Global System for Mobile communications) network 14. The GSM network is coupled to the network 12, here by way of a mobile switching center (MSC) 16 that forms part of the GSM network. The GSM network permits telephonic communications to be effectuated with mobile stations, of which the mobile station 18 is representative.

The mobile station 18 is representative of a mobile telephonic station capable of forming an originating or terminating telephonic station that originates or terminates telephonic calls. Conventional of many mobile stations, the mobile station 18 is permitted mobility, and telephonic communications are effectuable with the mobile station when the mobile station is positioned at almost any location encompassed by the wireless network.

Fixed-site telephonic stations, of which the telephonic station 22 is representative, are, as just-noted, also capable of originating and terminating calls during operation of the communication system.

The network entities of which the telephonic network is formed include one or more switch elements (SW) 26 that perform switching functions to cause routing of calls through the network. In the exemplary implementation in which the telephonic network forms a TDM network, the switch element forms a TDM switch, and the telephonic network is formed of a plurality of switch elements. In an implementation in which the telephonic network forms a next generation (NG) network, the switch element 26 is representative of a soft switch that functionally controls operations in the telephonic network separate from the physical call connections that are represented by way of the switch element shown in the Figure.

Here, the switch element is coupled to an E-911 tandem switch 32. E-911 switch tandems are positioned throughout the telephonic network, and, typically, groups of the switch elements 26 are coupled to selected ones of the E-911 tandem switches. The block 34 encompassing both the switch element 26 and the E-911 tandem switch represents any call routing entity that operates to route a call placed by an originating station to an emergency service center forming a public safety answering point, designated in FIG. 1 at 38.

Over a large geographical area, a plurality of public safety access points 38 corresponding to a plurality of different emergency service centers are connected to the telephonic network. The different ones of the public safety answering points might well be positioned at widely disparate geographical locations. But, the public safety answering points are all identified by a common dialing code. In the United States, for instance, and as noted above, an emergency, 9-1-1 dialing code is designated by the NENA as the universal emergency number that, when entered at any originating station encompassed by the 911 systems, routes the call to a public safety answering point designated for the area in which the originating station is located. A call request is originated, for instance, at the telephonic station 22 by entry of the 9-1-1, or other appropriate, universal dialing code to request assistance, or otherwise communicate with a service center forming a public safety access point. The call is routed to the switch element 26. When the switch element determines the dialing code is formed of the 9-1-1, or other appropriate, dialing code, inquiry is made of the tandem switch 32 to determine to where to route the call request so that the call connection can be formed. Conventionally, each tandem switch contains a separate data base to identify, by its emergency services number, or other number, the public safety access point to where to route the call, depending upon the location of the originating station at which the call request is originated. Maintaining the data bases at the plurality of tandem switches with up-to-date information is problematical, for reasons noted previously.

Apparatus 44 of an embodiment of the present invention also forms a portion of the telephonic network 12. The apparatus 44 includes a central routing data base 46 and a coordinate routing data base 48. In the exemplary implementation, the routing data base 46 is embodied at a signaling transfer point (STP). In an alternate implementation, the data base 46 is embodied at a service control point. And, in other implementations, the data base is embodied at other physical entities. And, the coordinate routing data base is embodied at analogous such structures or at a signaling server.

The data base is accessible by the E-911 tandem switch, and, more generally, by the call routing entity 34. And, the data base is also accessible by other tandem switches 32 or call routing entities positioned throughout the telephonic network.

The data base centralizes the information that associates the telephonic stations, such as the telephonic station 22 together with an appropriate public safety access point, such as by its emergency service number, to which to route the call. Through such association, a call placed by any originating station using the universal emergency number is caused to be routed to the most-appropriate public safety access point.

The coordinate routing data base 48 operates to maintain a depository listing of positional indicia identifying locations at which the mobile stations are positioned, together with public safety access points associated with such positions. When a call, using the universal emergency access number is originated at a mobile station, the call is routed through the wireless network through the call routing entity 34, and the coordinate routing data base 48 is accessed to obtain the identity of the public safety access point to which to route the call originated by the mobile station. Again, as the coordinate routing data base forms a centralized data base, updates to the contents of the data base are quickly and readily effectuated, when needed.

The apparatus 44 is implemented in any desired manner, and at any desired physical location, to provide centralized data bases, accessible by call routing entities to ascertain to where to route a call identified by a universal access number, such as the universal emergency access number. The conventional need to access and to update contents stored at a plurality of E-911 tandem switches, or other switching entities, is obviated as the centralized data bases forming the apparatus 44 are instead updated.

Figures 2, 3, 5:
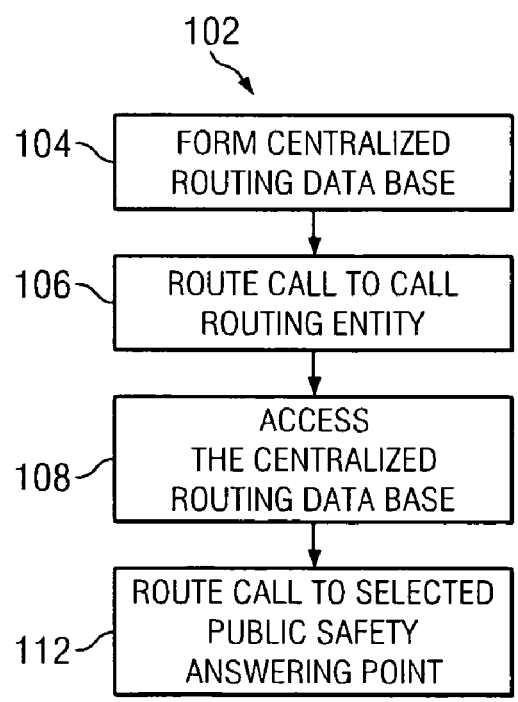
FIG. 2 illustrates a representation of a data base formed and accessed pursuant to operation of an embodiment of the present invention.
FIG. 3 illustrates a representation, similar to that shown in FIG. 2, here of another data base accessed, also during operation of an embodiment of the present invention, when a call is originated at a mobile station to a public safety answering point.
FIG. 5 illustrates a method flow diagram listing the method steps of the method of operation of an embodiment of the present invention.

FIG. 2 illustrates an exemplary data base listing of the centralized coordinate routing data base 46. In a first column 56, the telephonic identity, i.e., the telephonic number of telephonic stations that might form calling stations at which universal calling codes are entered are listed. And, indexed together with such numbers, in the column 58, are identities of public safety access points associated therewith.

FIG. 3 illustrates a representation of the coordinate routing data base also forming part of the apparatus of an embodiment of the present invention. The XY positional indicia associated with a caller are listed in the column 64. And, the public safety answering points associated with the positional coordinates are listed in the column 66. The appropriate data base is accessed and the information identifying the public safety access point is retrieved therefrom to permit routing of a call to an appropriate public safety access point.

FIG. 4 again illustrates portions of the telephonic communication system 10 that includes the apparatus 44 of an embodiment of the present invention as a portion thereof. A switching point forming a switch element 26 is positioned to receive a call request, here indicated as an E-911 call request on the line 72. The switch entity is coupled to an E-911 tandem switch pair 32. When the E-911 call request is delivered to the switch entity, the switch entity hands off the call to the tandem switch 32 as indicated by the segment 74. The tandem switch, in turn, inquires, indicated by the segment 76, of the central routing data base 46, here two central routing data bases are shown.

Figure 4:
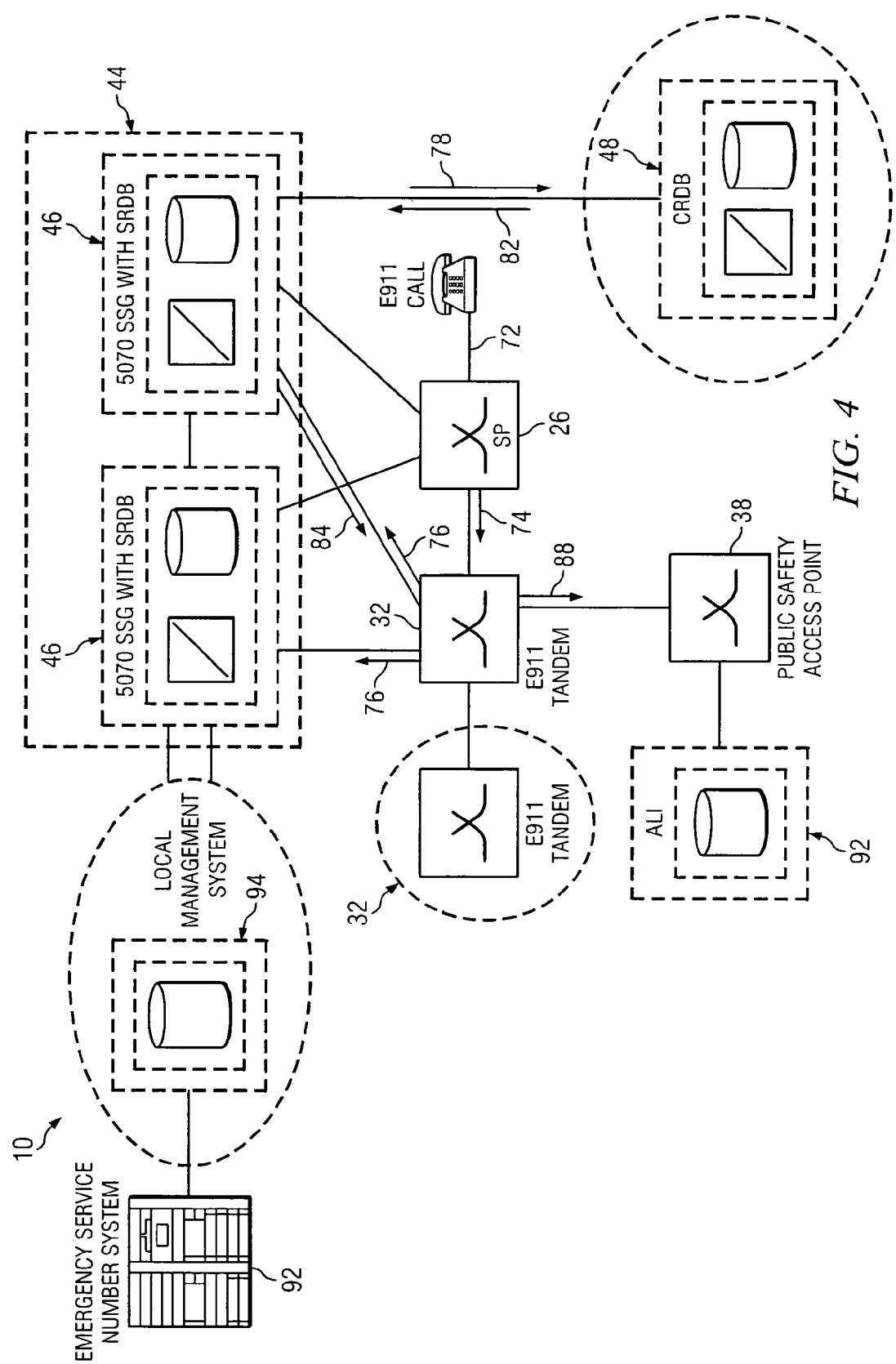
FIG. 4 illustrates portions of the telephonic communication system shown in FIG. 1, together with signaling generated during operation of an embodiment of the present invention.

In the event that the call is originated by a mobile station, inquiry is made, indicated by the segment 78 of the coordinate routing data base 48. Retrieved information is indicated by the segments 82 and 84 to provide the switch 32 with the appropriate identity of the selected public safety access point to which the call should be routed. And, as indicated by the segment 88, the call is routed to the appropriate public safety access point 38. Thereby, the call is completed to the appropriate public safety access point, and the calling station from which the call is originated. FIG. 4 further shows an ALI (automatic location identification) database 90, an emergency service number system 92 and a gateway 94 that is coupled to the centralized routing data bases 46.

FIG. 5 illustrates a method, shown generally at 102, of the method of operation of an embodiment of the present invention. The method facilitates service handling of a call placed to a selected public safety answering point of a set of public safety answering points.

First, and as indicated by the block 104, a centralized routing data base containing a listing indexing together calling station identity of the calling station and a public safety identity of at least one of the public safety access points is formed. The centralized routing data base is maintained in communication connectivity with call routing entities of a set of call routing entities.

Then, and as indicated by the block 106, the call is routed, when originated at the calling station, to the call routing entity of the set of call routing entities. Thereafter, and as indicated by the block 108, the centralized routing data base is accessed by the call routing entity. Access identifies the selected public safety answering point to which further to route the call. The selected public safety answering point comprises the public safety answering point that is indexed together with the calling station.

Thereafter, and as indicated by the block 112, the call is routed to the selected public safety answering point.

The previous descriptions are of preferred examples for implementing the invention, and the scope of the invention should not necessarily be limited by this description. The scope of the present invention is defined by the following claims:

What is claimed is:

1. In a telephonic communication system permitting of a call, originated at a calling station, to be placed to a selected public safety answering point of a set of public safety answering points by way of a call routing entity of a set of call routing entities, an improvement of apparatus for facilitating service handling of the call to the selected public safety answering point together with providing selected information pertaining to the calling station to the selected public safety answering point, said apparatus comprising:

a centralized routing data base maintainable in communication connectivity with each call routing entity of the set of call routing entities, said centralized routing data base containing a listing indexing together a calling-station identity of the calling station and a public safety identity of at least one of the public safety access points, said centralized routing data base accessed by the call routing entity by way of which the call is placed at least to identify the selected public safety answering point to which to route the call, the selected public safety answering point comprising the public safety answering point indexed together with the calling station; and a signaling transfer point (STP) having the centralized routing database at the STP, wherein the STP directly accesses the centralized routing data base, wherein the centralized routing data base is maintained in communication connectivity with each call routing entity by way of the STP, and wherein the information of the centralized routing data base is updated by way of the signaling transfer point.

2. The apparatus of claim 1 wherein the selected information pertaining to the calling station comprises positional indicia identifying a location at which the calling station is positioned when the call is originated.

3. The apparatus of claim 1 wherein the public safety access points each have associated therewith an emergency services number and wherein the public-safety identity forming part of the listing contained at said centralized routing data base comprises the emergency services number associated therewith.

4. The apparatus of claim 3 wherein said centralized routing database comprises a NENA-compliant (National Emergency Numbering Association-compliant) PSAP (Public Safety Answering Point) routing data base.

5. The apparatus of claim 1 further comprising a centralized location identifier data base also maintainable in communication connectivity with each call routing entity of the set of call routing entities, said centralized location identifier data base containing positional indicia associated with the calling station.

6. The apparatus of claim 1 wherein each call routing entity of the set of call routing entities comprises a 9-1-1 tandem switch element and wherein said centralized call routing data base is maintained in communication connectivity with each of the 9-1-1 tandem switches.

7. The apparatus of claim 1 wherein the calling station comprises a mobile station, the mobile station having associated therewith positional indicia identifying a location thereof when the call is originated therefrom, indications of the positional indicia used to identify which of the public safety access points comprises the selected public safety access point.

8. The apparatus of claim 7 further comprising a centralized routing node at which said centralized routing data base is embodied, the positional indicia identifying the location of the mobile station further maintained at the centralized routing node.

9. The apparatus of claim 1 wherein the call routing entity by way of which the calling station places the call inquires of said centralized routing database of the selected public safety answering point associated with the calling station, and wherein the call routing entity routes the call to the selected public safety answering point responsive to responses made to inquiry of the centralized routing data base.

10. In a method for communicating in a telephonic communication system permitting of a call, originated at a calling station, to be placed to a selected public safety answering point of a set of public safety answering points by way of a call routing entity of a set of call routing entities, an improvement of a method for facilitating service handling of the call to the selected public safety answering point together with providing selected information pertaining to the calling station to the selected public safety answering point, said method comprising:

forming a centralized routing data base at a signaling transfer point (STP) containing a listing indexing together a calling station identity of the calling station and a public safety identity of at least one of the public safety answering points, the centralized routing data base maintainable in communication connectivity with each call routing entity of the set of call routing entities by way of the STP;

routing the call, when originated at the calling station, to the call routing entity of the set of call routing entities;

accessing the STP, from the call routing entity, and directly accessing by the STP the centralized routing data base, to identify therefrom the selected public safety answering point to which further to route the call, the selected public safety answering point comprising the public safety answering point indexed together with the calling station; and updating the information of the centralized routing data base by way of the signaling transfer point.

11. The method of claim 10 wherein the calling station comprises a mobile station and wherein said method further comprises the operation of forming a centralized positional indication data base containing positional indicia associated with the calling station.

12. The method of claim 11 wherein the positional indication data base formed during said operation of forming the centralized positional indication data base further associates public safety answering points associated with the positional indicia.

13. The method of claim 12 wherein the centralized positional indication data base and the centralized routing data base are embodied theretogether.

14. The method of claim 11 further comprising the operation of accessing the positional indication data base to ascertain the public safety answering point associated with the mobile station when positioned at a location indicated by the positional indicia.

15. The method of claim 10 wherein the public safety answering points each have associated therewith an emergency services number and wherein the public safety identity forming part of the listing contained in the data base formed during said operation of forming comprises the emergency service number associated with the public safety answering point.

16. The method of claim 10 wherein the centralized routing data base formed during said operation of forming comprises an NENA-compliant (National Emergency Numbering Association-compliant) public safety answering point routing data base.

17. The method of claim 10 comprising the further operation of further routing the call to the public safety answering point.

* * * * *